United States Patent
Akins

(10) Patent No.: US 7,053,785 B2
(45) Date of Patent: May 30, 2006

(54) SECURITY PRESCREENING DEVICE

(76) Inventor: James Edward Akins, 1920 Bayview Dr., Fort Myers Beach, FL (US) 33931

( * ) Notice: Subject to any disclaimer, the term of this patent is extended or adjusted under 35 U.S.C. 154(b) by 142 days.

(21) Appl. No.: 10/701,938

(22) Filed: Nov. 5, 2003

(65) Prior Publication Data
US 2005/0146441 A1 Jul. 7, 2005

Related U.S. Application Data

(60) Provisional application No. 60/437,066, filed on Dec. 30, 2002.

(51) Int. Cl.
G08B 13/24 (2006.01)
G01V 3/11 (2006.01)
(52) U.S. Cl. .............. 340/693.9; 340/693.5; 340/551
(58) Field of Classification Search ........... 340/551, 340/693.9–693.12; 324/228, 243; 108/107; 361/683–685
See application file for complete search history.

(56) References Cited

U.S. PATENT DOCUMENTS

| 1,887,169 | A | * | 11/1932 | Ross .................... 177/161 |
| 3,059,780 | A | * | 10/1962 | D Anka ................. 108/107 |
| 3,844,231 | A | * | 10/1974 | Peacock ................ 108/107 |
| 3,971,983 | A | | 7/1976 | Jaquet |
| 4,400,002 | A | * | 8/1983 | Stillmunkes ........... 280/164.2 |
| 4,656,954 | A | | 4/1987 | Tonali |
| 5,039,981 | A | * | 8/1991 | Rodriguez .............. 340/551 |
| 5,959,451 | A | * | 9/1999 | De Torfino ............. 324/236 |
| 6,211,672 | B1 | * | 4/2001 | Bauman et al. ......... 324/226 |
| 6,222,450 | B1 | * | 4/2001 | Clements ............... 340/568.1 |
| 6,359,582 | B1 | | 3/2002 | MacAleese et al. |
| 6,362,739 | B1 | | 3/2002 | Burton |
| 6,373,695 | B1 | * | 4/2002 | Cheng .................. 361/685 |
| 6,469,889 | B1 | * | 10/2002 | Gan ..................... 361/685 |
| 6,870,791 | B1 | * | 3/2005 | Caulfield et al. ........ 367/11 |
| 2003/0080868 | A1 | * | 5/2003 | Nelson ................. 340/551 |
| 2004/0051867 | A1 | * | 3/2004 | Brestel et al. .......... 356/318 |
| 2004/0113781 | A1 | * | 6/2004 | Stis ..................... 340/551 |

(Continued)

FOREIGN PATENT DOCUMENTS

DE    EP-0978734 A2 *  9/2000

(Continued)

OTHER PUBLICATIONS

Brinn D. , "Israel's Magshoe provides a step ahead in security solutions", Oct. 31, 2004. http://www.israel21c.org/bin/en.jsp?enPage=BlankPage&enDisplay=view&enDispWhat=object&enDispWho=Articles1823&enZone=Culture&enVersion=0&.*

(Continued)

Primary Examiner—Jeffery Hofsass
Assistant Examiner—Anne V. Lai
(74) Attorney, Agent, or Firm—Marshall, Gerstein & Borun LLP

(57) ABSTRACT

An apparatus for prescreening an individual about to be subjected to a security screening including a magnetometer. The prescreening device comprises a base housing having a top panel, and a plurality of downwardly extending sidewalls. The base housing is adapted to adjustably support a metal detector within the base housing such that when an individual places an object, such as a shoe, in proximity to the base housing, the metal. detector detects the presence of metal, weapons, explosives, or other contraband in the object, thereby alerting the individual that the object may contain enough material to alarm the magnetometer. The individual may then take the necessary steps to remove the object from their persons, thereby possibly reducing the number of potentially false magnetometer alarms.

3 Claims, 7 Drawing Sheets

U.S. PATENT DOCUMENTS

2004/0178789 A1* 9/2004 Candelore et al. ........... 324/226
2004/0222790 A1* 11/2004 Karmi et al. ................ 324/300
2005/0116825 A1* 6/2005 Manneschi .................. 340/551

FOREIGN PATENT DOCUMENTS

DE          EP-1411373 A2 * 4/2004

OTHER PUBLICATIONS

Magshoe, http://www.terminalsecurity.info/page.cfm/T=m/Action=PressID=44.*

Ritche, J., "Security Device is a Family Afair," Pittsburgh Tribune-Reivew, http://www.pittsburghlive.com/x/tribune-review/news/print$_{13}$147902.html, 2 pages, printed Aug. 4, 2003.

The Associated Press, "Eagle Scout Project Giant Step to Speed up Lines at O'Hare," The News-Press, Jul. 26, 2003, 1 page.

Warren, A., "Airports Install Homemade Shoe Scanners," azcentral.com, dated Jul. 24, 2003, printed Jul. 31, 2003, 3 pages.

Hilkevitch, J., "Rockford Scout Goes Sole Searching," Chicago Tribune, http://www.chicagotribune.com/technology/chi-0307250068jul25,0,5745037.story?coll=chi-technology-hed, dated Jul. 25, 2003, printed Jul. 31, 2003, 2 pages.

The Associated Press, "Teen's Eagle Scout Project Used in O'Hare Security," USATODAY.com, printed Jul. 31, 2003, 3 pages.

* cited by examiner

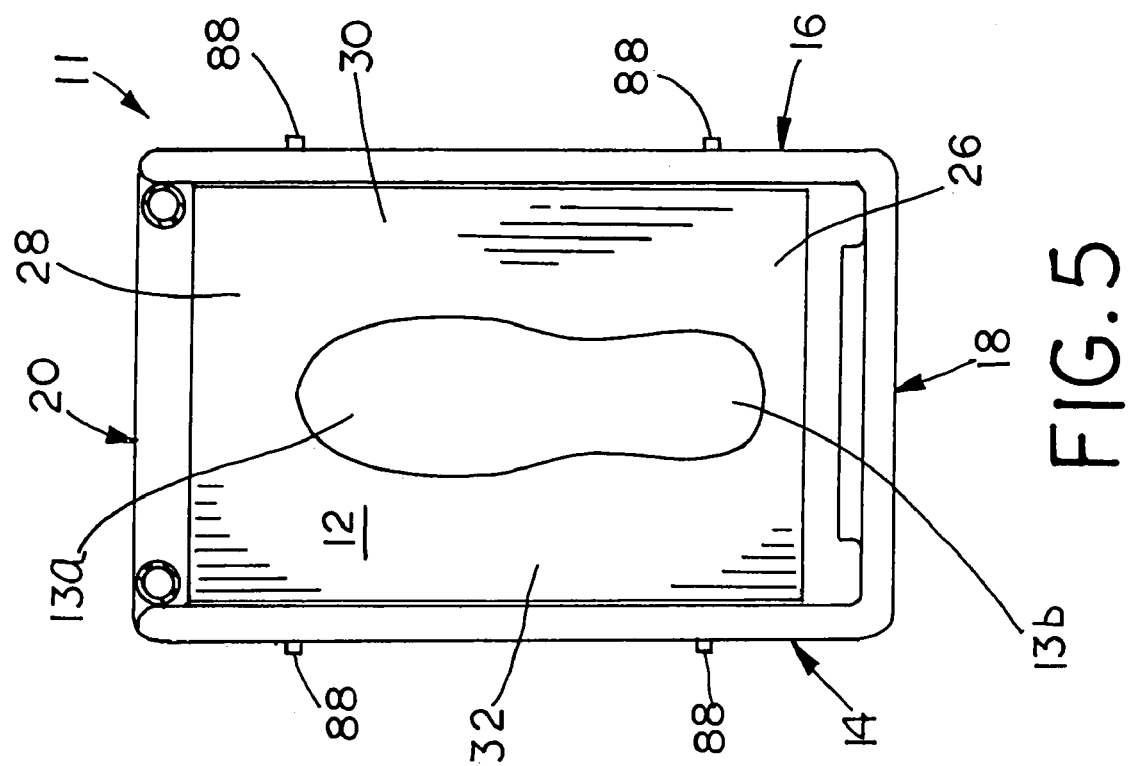
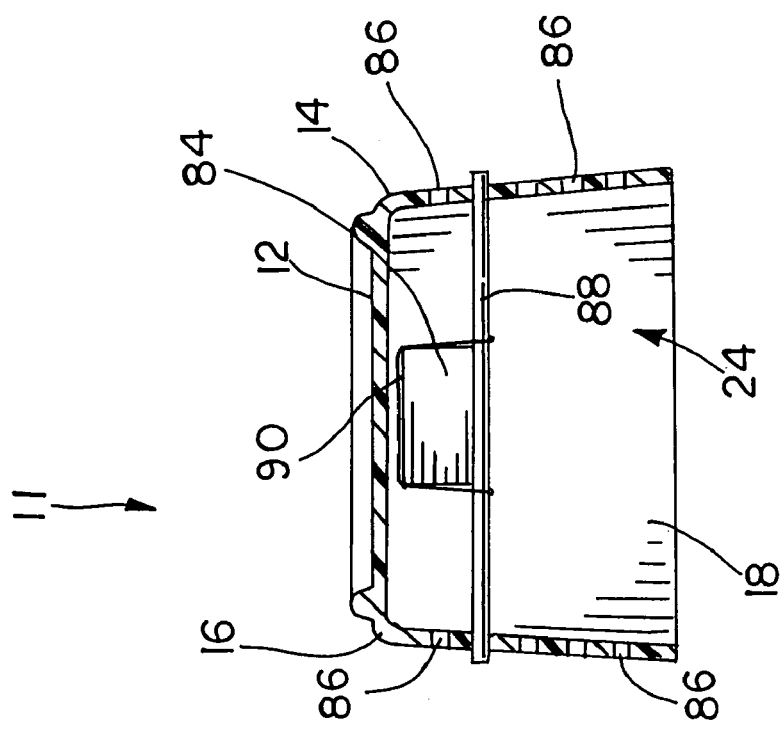

SECURITY PRESCREENING DEVICE

CROSS REFERENCE TO RELATED APPLICATION

This application is a non-provisional application claiming priority from U.S. Provisional Application Ser. No. 60/437,066, titled "Shoe Scan" and filed Dec. 30, 2002.

FIELD OF THE INVENTION

The present invention relates generally to a security prescreening device for use with an airport or other security screening station and, more specifically, to a security prescreening device for detecting weapons, metal, or other contraband, in shoes or other objects subjected to a screening process.

BACKGROUND

There exist a number of security screening stations in a variety of locations such as transportation terminals, sporting events, building lobbies, and the like, to insure the safe passage of individuals utilizing such facilities. Typically, security screening stations include a primary screening device, such as a magnetometer, otherwise known as a walk through metal detectors. In operation, individuals subjected to a screening process are instructed to walk through the metal detector, wherein the metal detector may detect the presence of enough metal or other contraband to set off an alarm. Once an alarm has been activated, the individual may be subjected to a more thorough screening process. In the wake of historical world events, airline passengers as well as other individuals, have been subjected to an even greater security screening process. Thus, the number of alarms requiring additional screening has typically increased, often resulting in significant screening station delays.

In an attempt to reduce the delays at some screening stations, individuals are often instructed to remove any metallic objects prior to proceeding through the screening process. While most individuals may quickly remove some items such as glasses, watches, rings, etc., still other items which may include metal, such as shoes, often take time to both remove prior to the screening process and replace after the screening process. Therefore, the individual subjected to the screening is often left with two choices: either proceed through the screening station and hope their shoes do not alarm the metal detector; or spend time removing their shoes, often unnecessarily, prior to proceeding through the metal detector. Either option may result in wasted time and/or frustration as the former may cause the screeners to spend unnecessary time resolving potentially false alarms, while the latter may result in unnecessary effort and delay on the part of the individuals subjected to the screening.

Therefore, it is desirable to provide a prescreening device which may alert persons subjected to a screening process that their shoes may contain enough material to alarm a metal detector. In this way, the individual may take the proper steps to avoid an alarm caused by their shoes. Similarly, those individuals without sufficient material present in their shoes to cause an alarm may proceed through the screening process without delay.

BRIEF DESCRIPTION OF THE DRAWINGS

FIG. 5 is a plan view of the base of the prescreening device illustrated in FIG. 2;

FIG. 7 is a cross sectional view taken along the line 7—7 of FIG. 3; and

DETAILED DESCRIPTION OF THE VARIOUS EMBODIMENTS

The examples described herein are not intended to be exhaustive or to limit the scope of the invention to the precise form or forms disclosed. Rather, the following exemplary embodiments have been chosen and described in order to best explain the principles of the invention and to enable others skilled in the art to follow the teachings thereof.

Figure 1:
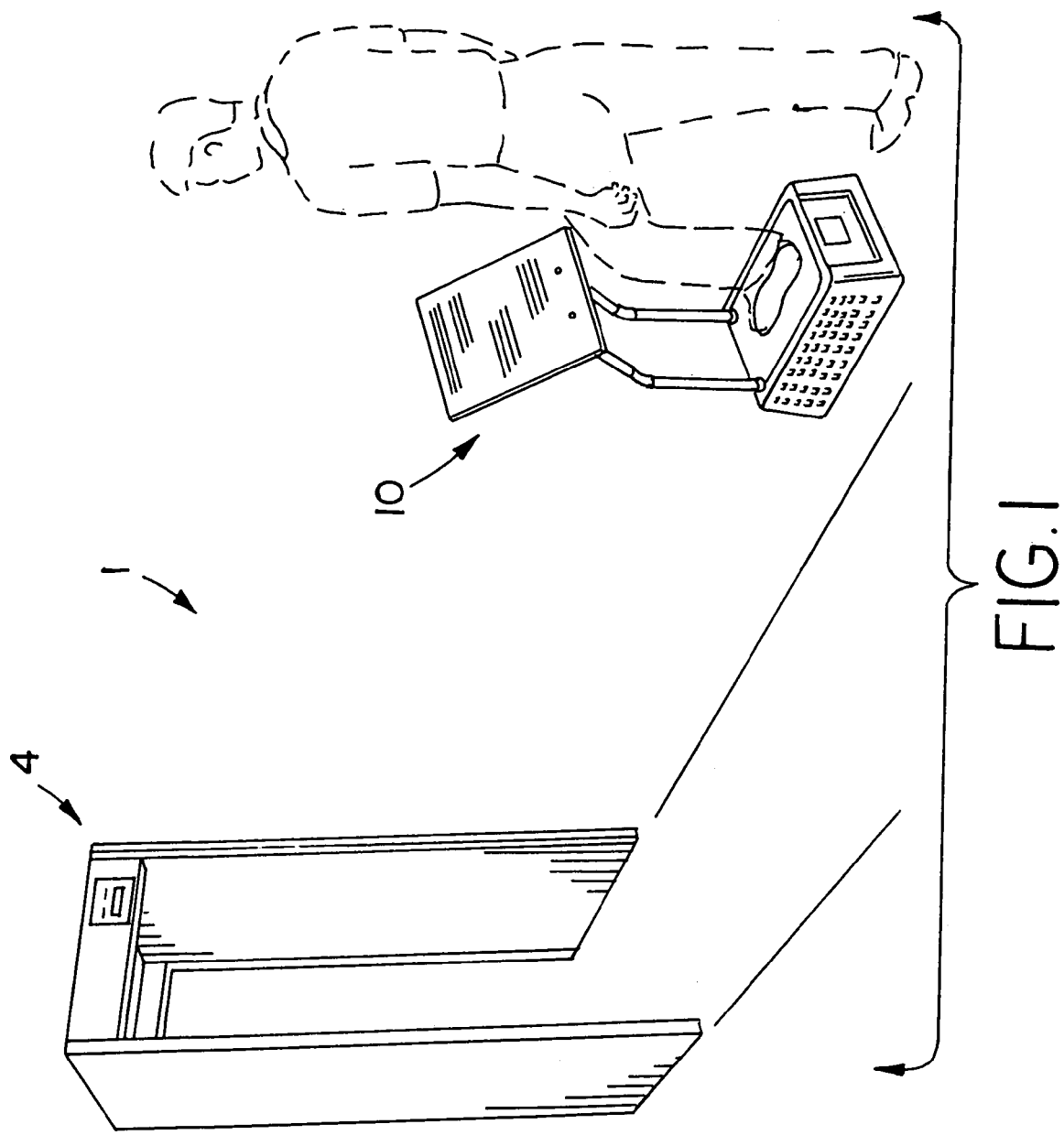
FIG. 1 is a perspective view of a security screening station which may utilize a prescreening device assembled in accordance with the teachings of the present invention.

As shown in FIG. 1, one embodiment of a screening station is generally referred to by the reference numeral 1. The screening station 1 may include a primary screening device 4 such as a walk through metal detector and a prescreening device, a prescreening device 10 assembled in accordance with the teachings of an embodiment of the present invention. The primary screening device 4 may be any device known or yet to be developed which may screen an individual, or an object for contraband, such as weapons, metal, explosives, or the like, and therefore will not be described herein. The primary screening device 4 typically sounds an alarm when contraband is passed through the device. The prescreening device 10 may be utilized, as described below, to prescreen the individual for contraband, thereby potentially reducing the number of potentially false alarms sounded by the primary screening device 4.

Figure 6:
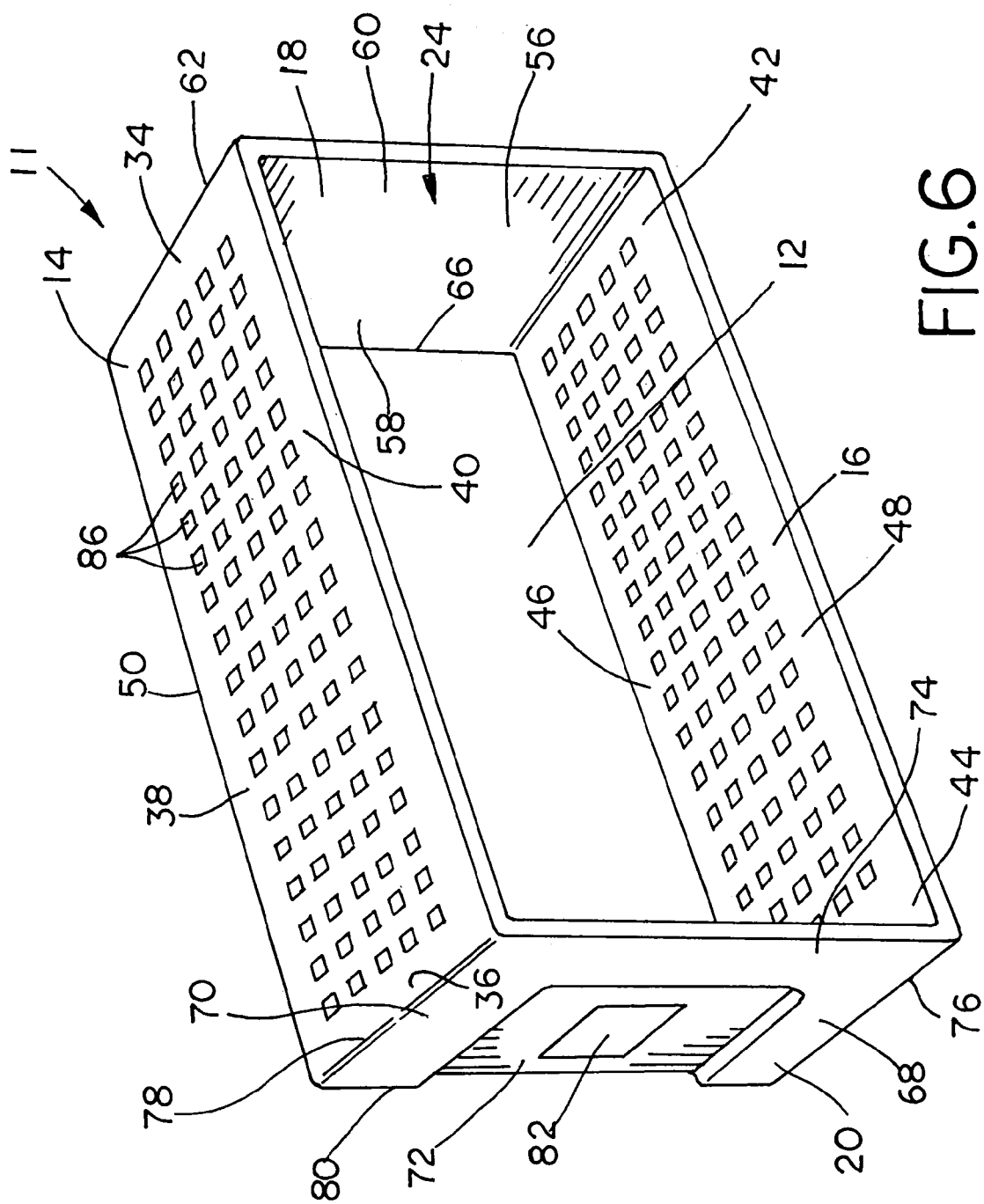
FIG. 6 is a bottom perspective view of the base of the prescreening device illustrated in FIG. 2.

Referring now to FIGS. 2–7 of the drawings, the prescreening device 10 generally includes a base 11 having a top panel 12, and a plurality of downwardly extending walls, including a pair of sidewalls 14, 16, a front wall 18, and a back wall 20. The top panel 12, the pair of sidewalls 14, 16, and the front wall 18 and the back wall 20 cooperate to generally define an interior compartment 24, as best shown in FIG. 6. In the illustrated embodiment, the base 11 may be, for example, a Rubbermaid Basket model # 1A14 marketed by Wal-Mart Stores, Inc., of Bentonville, Ark.

Figure 2:
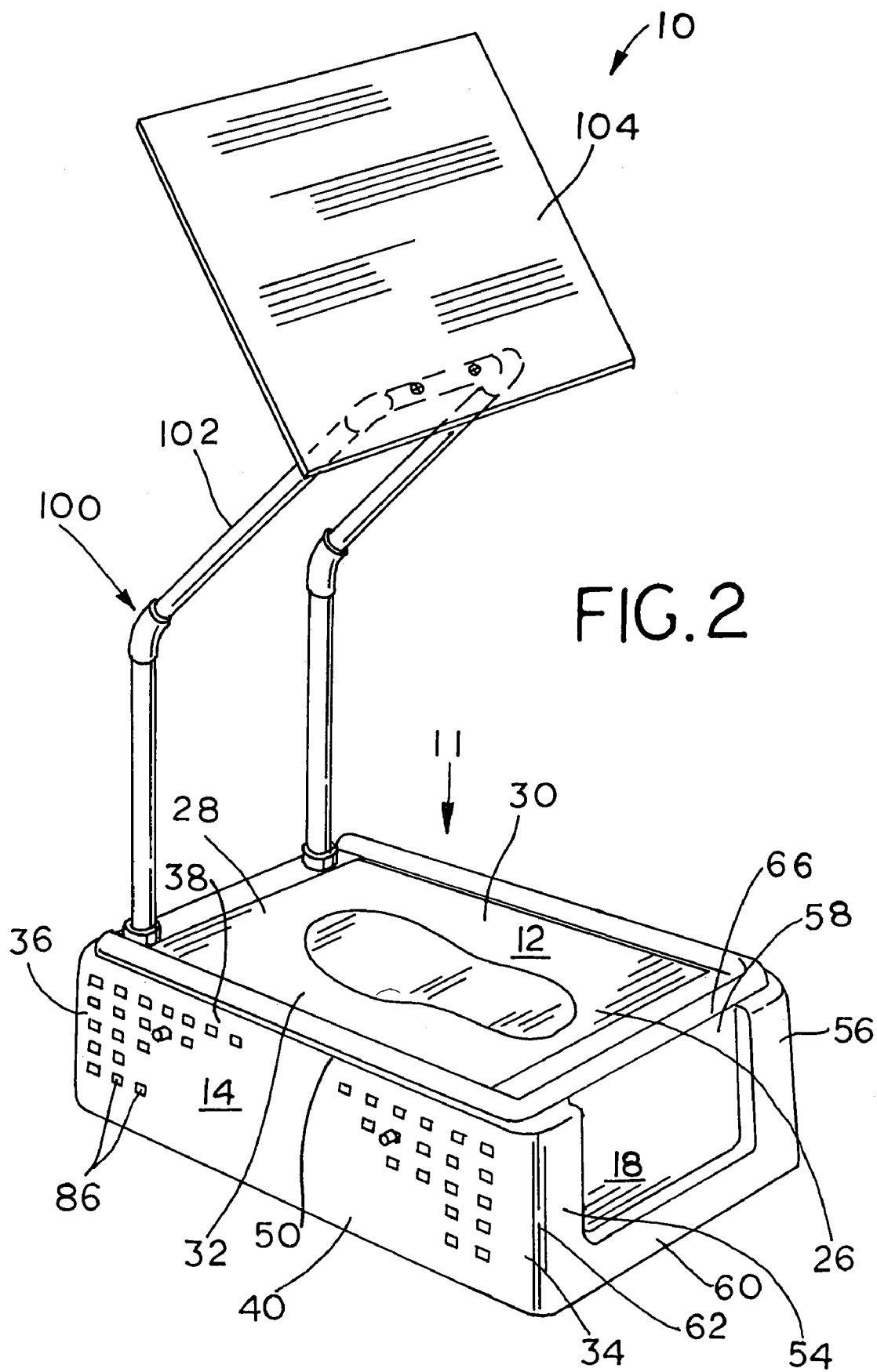
FIG. 2. is a perspective view of an embodiment of a prescreening device assembled in accordance with the teachings of the present invention.

Turning to FIGS. 2 and 5, the top panel 12 includes a forward portion 26, a rearward portion 28, and a pair of interconnecting side portions 30 and 32. In the illustrated embodiment, the top panel 12 is generally rectangular in shape and may be constructed of any material that does not trigger a weapons/metal detector, including, for example, wood, glass, plastic, or the like. The top panel 12 may be sized so as to accommodate an average adult human shoe size, and in the disclosed embodiment, the top panel 12 is approximately twenty inches from the forward portion 26 to the rearward portion 28 and approximately eleven inches from the interconnecting side 30 to the interconnecting side 32.

The top panel 12 may optionally include a visual cue 13 or other indicia to display information and/or to assist an individual in the proper operation of the prescreening device 10. It will be understood that the visual cue 13 may be any indicia and/or text, such as, for example, a picture, a set of written instructions, or the like. In the disclosed example, the visual cue 13 resembles a shoe print and includes a toe portion 13a, and a heal portion 13b. In operation, an individual places their shoe toe generally at the toe portion 13a, and their shoe heal generally at the heal portion 13b.

Figure 3:
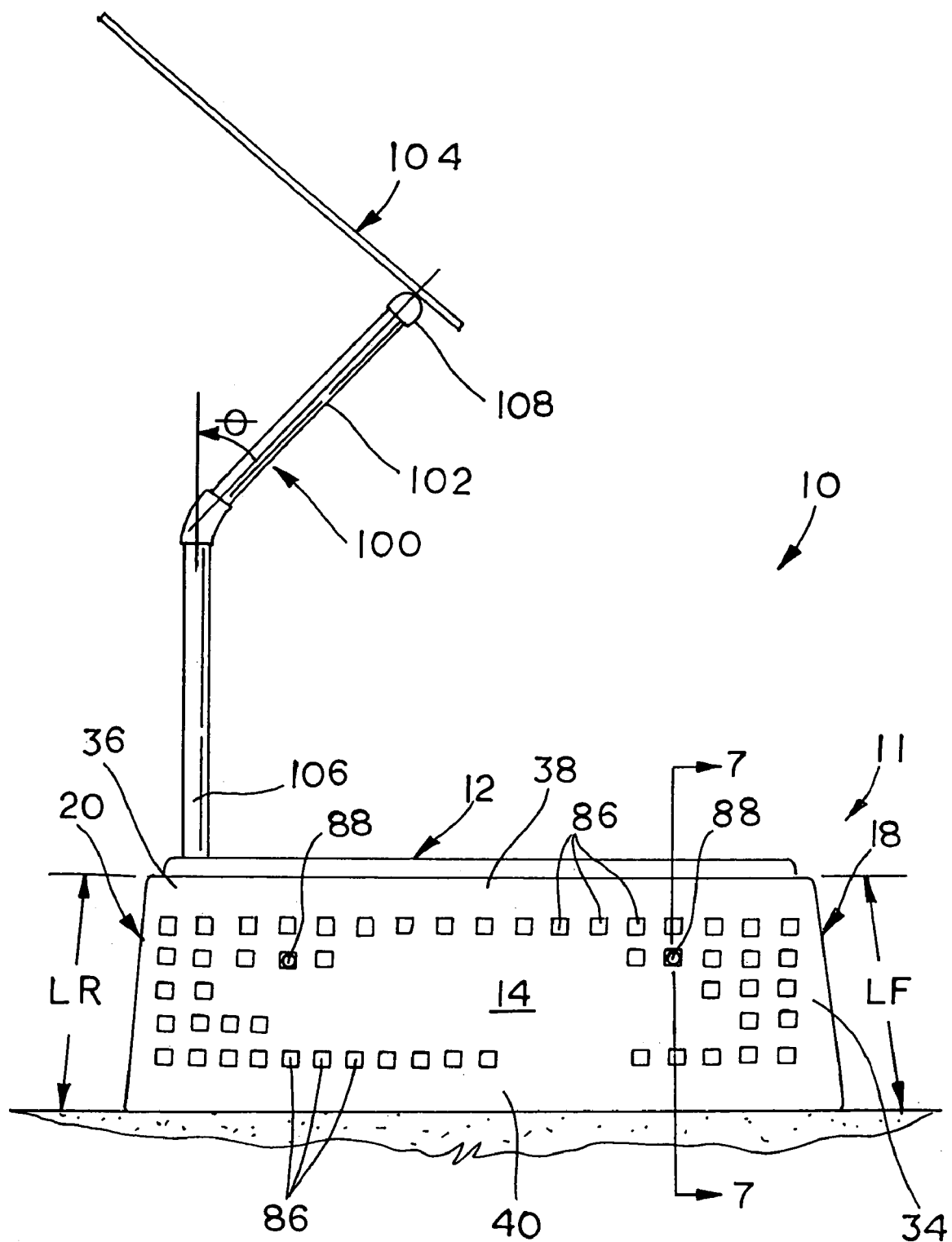
FIG. 3 is a left elevational view of the prescreening device of FIG. 2.

Referring now to FIGS. 2, 3 and 6, the sidewall 14 of the prescreening device 10 includes a forward portion 34, a rearward portion 36, and a top and bottom portions 38, 40 respectively. The sidewall 16 of the prescreening device 10 includes a forward portion 42, a rearward portion 44, and a top and bottom portions 46, 48 respectively. In the illustrated embodiment, the sidewalls 14, 16, are generally rectangular in shape and may also be constructed of any material, including any material that does not trigger a metal detector, such as, for example, wood, glass, plastic or the like. Specifically, in the disclosed embodiment, the forward portions 34, 42 have a length $L_F$ which is similar to a length $L_R$ of the rearward portions 36, 44, such that the top portions 38, 46 are generally parallel to the bottom portions 40, 48.

As shown in FIG. 6, the top portion 38 of the sidewall 14 meets the interconnecting side portion 32 of the top panel 12 along an elongated seam 50. Similarly, the top portion 46 of the sidewall 16 meets the interconnecting side portion 30 of the top panel 12 along an elongated seam 52. Preferably, seams 50 and 52 are commonly formed seams as are known or yet to be developed, including, for example, molded seams, welded seams, joint seams, or the like, as well as any permanent or semi-permanent seam.

Referring again to FIGS. 2 and 6, the front wall 18 includes a pair of side portions 54, 56 and top and bottom portions 58, 60 respectively. Again, in the illustrated embodiment, the front wall 18 is generally rectangle in shape and may be constructed of any material, including non-alarming materials. The side portion 54 meets the forward portion 34 of the sidewall 14 along a seam 62, while the side portion 56 meets the forward portion 42 of the sidewall 16 along a seam 64. The top portion 58 of the front wall 18 meets the forward portion 26 of the top panel 12 along a seam 66. The seams 62, 64, 66 are preferably commonly formed seams as are known or yet to be developed.

The back wall 20 includes a pair of side portions 68, 70 and a top and bottom portions 72, 74 respectively. The side portion 68 meets the rearward portion 44 of the side panel 16 along a seam 76, while the side portion 70 meets the rearward portion 36 of the side panel 14 along a seam 78. The top portion 72 of the back wall 20 meets the rearward portion 28 of the top panel 12 along a seam 80. Again, the seams 76, 78, 80 are preferably commonly formed seams as are known or yet to be developed.

Figure 4:
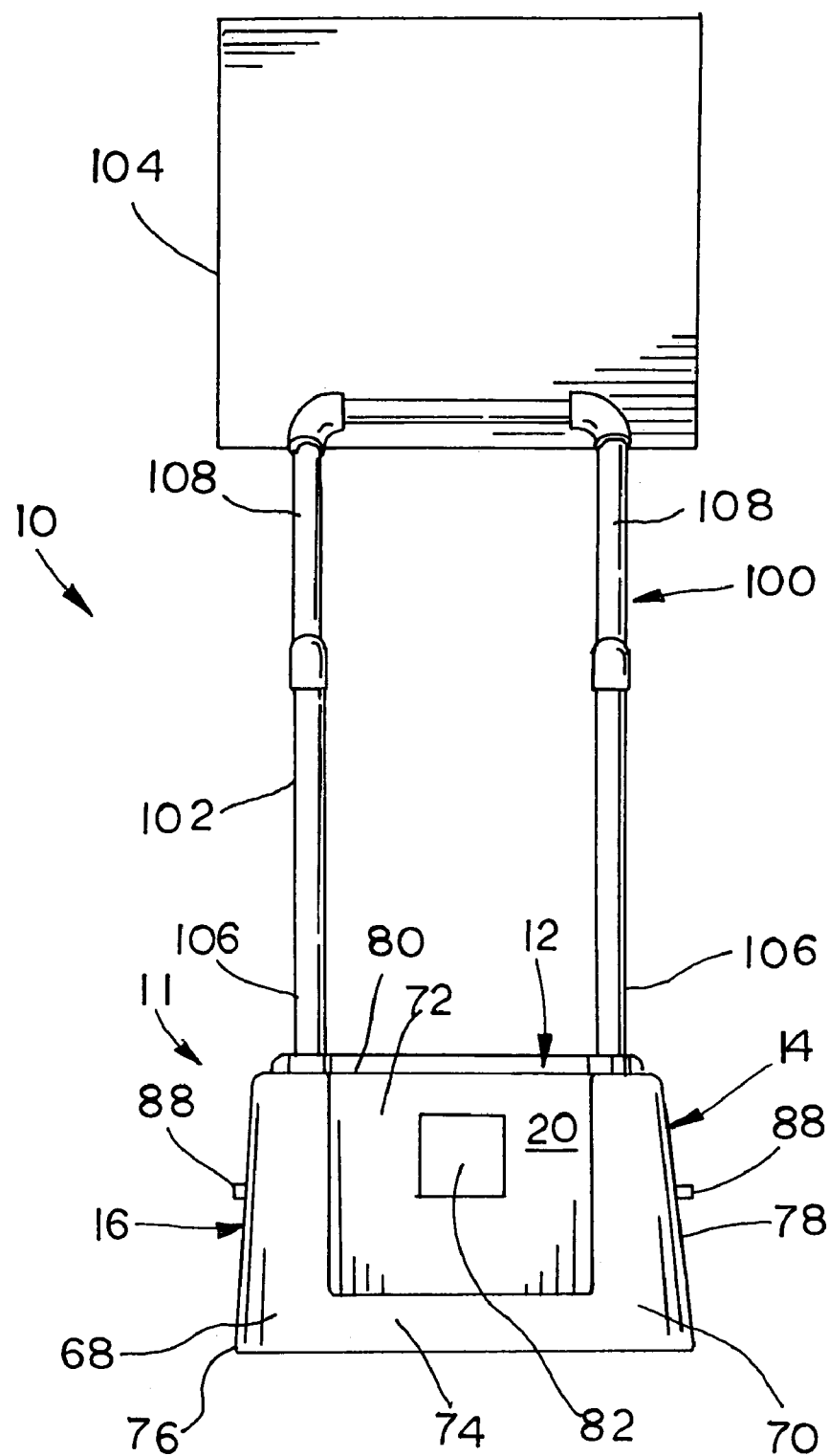
FIG. 4 is a rear elevational view of the prescreening device illustrated in FIG. 2.

Turning to FIG. 4, the back wall 20, may optionally include an access window 82 which may allow access to the compartment 24. Alternatively, the back wall 20 may optionally include an access panel (not shown) which may be hinged or otherwise moveable between an open and closed position, temporarily allowing access to the compartment 24. The access window 82 or access panel may be sized to allow for a metal detector 84 to at least partially pass through the access window. The access window 82 may allow an operator to service the metal detector 84, including, for example, changing the battery.

Referring now to FIGS. 2, 3 and 6, the side panels 14, 16 may include a plurality of apertures 86. The apertures 86, may be adapted to retain at least one metal detector support 88. In the illustrated embodiment, the metal detector support 88 may be a beam, such as a polyvinyl chloride (PVC) tubing portion. It will be understood, that while the apertures 86 and the metal detector support 88 are illustrated as a plurality of rectangular holes through the sidewalls 14, 16 adapted to support PVC tubing portions, one of any number of sidewall guides may be utilized, including notches, protrusions, and/or similar adjustable support guide, as well as any number of supports.

Referring now to FIG. 7, the base 11 is illustrated in a cross-sectional view taken along line 6—6 of FIG. 3. As shown in FIG. 7, the metal detector 84 may be supported by at least one metal detector support 88 such that the metal detector 84 is held in operational proximity to the top panel 12. It will be appreciated by one of ordinary skill in the art that the metal detector 84 may be any known or yet to be developed device capable of detecting weapons, metal, explosives, and/or other contraband, such as by way of example and not limitation, any device that is manufactured in compliance with the National Institute of Justice Standard-0602.01, titled "Hand-Held Metal Detectors for Use in Concealed Weapon and Contraband Detection," or other relevant and/or replacement standard. In the illustrated example, the metal detector 84 may be, for instance, a Garrett Superwand model #1163800 or #1165170, marketed by Garrett Metal Detectors of Garland, Tex. While the operational proximity to the top panel will vary depending upon the metal detector utilized, in the embodiment utilizing the Garrett Superwands mentioned above, the operational proximity of the metal detector to the top panel 12 may be any distance less than or equal to approximately two inches from top panel 12.

Referring again to FIG. 3, the base 11 utilizes two metal detector supports 88. As can be seen, the metal detector supports 88 may be moved to any number of apertures 86 to vary the distance between the top of the metal detector 84 and the top panel 12 as well as to adjust the metal detector 84 position relative to the front wall 18 and the back wall 20 (see FIG. 3). In this way, the base 11 may support any number of metal detectors as described above and commonly known by one of ordinary skill in the art.

The metal detector 88 may optionally be secured to the metal detector support 88 utilizing a securing device 90 which may be any know securing device including, for example, an elastic band, cable tie, or any other similar item or combination thereof. It will also be understood, that the metal detector 84 may be removably supported by the metal detector support 88 or may be permanently supported by the metal detector support 88, utilizing any known permanent or semi-permanent connection device such as, for example, screws, rivets, nails, glue, or similar item.

Referring once again to FIGS. 2, 3, and 4, the prescreening device 10 may be optionally configured with a display support 100 which may comprise a display stand 102, and a display unit 104. The display stand 102 includes a bottom portion 106 and a top portion 108. The bottom portion 104 of the display stand 102 may meet and extend upward from the rearward portion 28 of the top panel 12. The display stand 102 may be securely connected to the rearward portion 28 of the top panel 12, or may alternatively extend through the top-panel 12 and may be connected to the back wall 20 utilizing any known techniques, including for example, cable ties or the like. As shown in FIG. 4, the top portion 108 of the display stand 102 may support a display unit 104. The display unit 104 may be configured so that information relevant to the operations of the prescreening device 10 (e.g., instructions for use), relevant to the environment or other information may be shown. As shown in the illustrated embodiment, the display support 100 preferably extends upward and over the top panel 12 through an angle theta (θ) of approximately 45° to discourage a user from standing on the prescreening device 10. It will be appreciated, however, that in other embodiments, the display support 100 may not extend over the top panel 12, thereby allowing an individual to stand upon the base 11.

Figure 8:
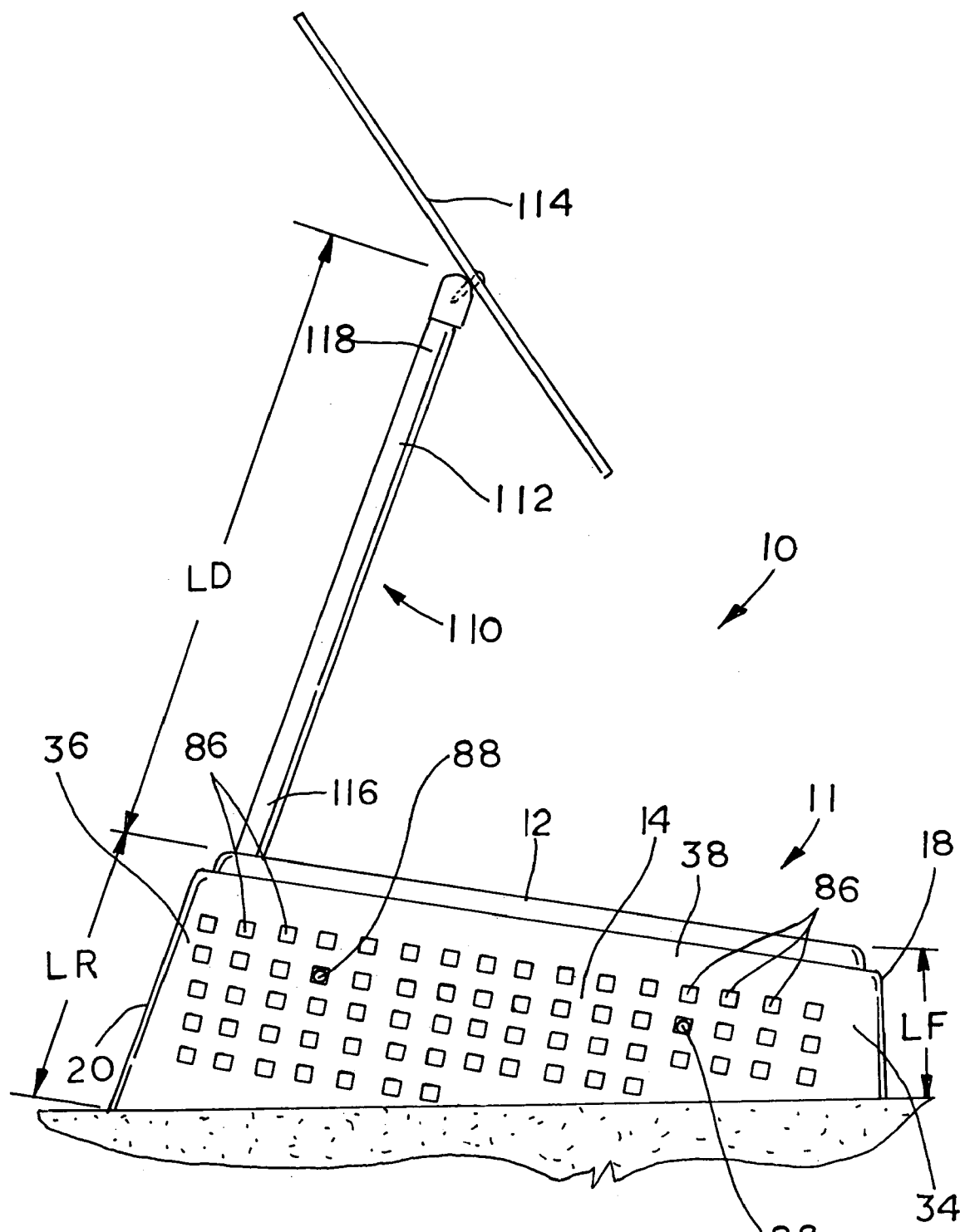
FIG. 8 is a left elevational view of another embodiment of a prescreening device assembled in accordance with the teachings of the present invention.

Turning now to FIG. 8, another embodiment of the prescreening device 10 is illustrated. In the disclosed embodiment, the sidewalls 14, 16 (not shown), are generally shaped such that the forward portions 34, 42 (not shown), are shorter in length than the rearward portions 36, 44 (not shown), respectively. Specifically, the length $L_F$ of the forward portions 34, 42, may be shorter than the length $L_R$ of the rearward portions 36, 44. In the disclosed example $L_F$ is approximately 4 inches and $L_R$ is approximately 11 inches. In this way, the base 11, and more specifically the top panel 12, may slope downwardly from the rearward portion 28 forward toward the forward portion 26, such that the forward portion 26 is lower than the rearward portion 28, thereby angling the base 11 and presenting a generally more comfortable operating position.

The prescreening device 10 of FIG. 8, may also optionally by configured with a display support 110 which may comprise a display stand 111, and a display unit 114. The display stand 112 includes a bottom portion 116 and a top portion 118. The bottom portion 114 of the display stand 112 may meet and extend upward from the rear portion 28 of the top panel 12. The display stand 112 may also be securely connected to the rearward portion 28 of the top panel 12, or again, may alternatively extend through the top panel 12 and may be connected to the back wall 20 as described in connection with the previous embodiment above. Also, similar to the previous embodiment, the top portion 118 of the display stand 112 may support a display unit 104, which preferably extends upward and over the top panel 12 to discourage a user from standing on the prescreening device 10. In the disclosed embodiment, the display stand 112 may extend a length LD of approximately 30 inches.

In operation, the prescreening device 10 may warn individuals subjected to a screening process whether an object placed within proximity of the top panel 12 may contain enough material to alarm the screening station's primary screening device 4. It will be understood that the proximity of the object to the top panel 12 may vary with the metal detector 84 utilized and may be a distance sufficient to cause the metal detector to detect the presence of metal and/or other contraband in the object.

Either before or after orienting the prescreening device 10 in the desired location, the operator of the prescreening device 10 may first adjust the metal detector supports 88 thereby placing the supports 88 across the width of the top panel 12 and underneath the top panel 12 in such a way that the metal detector 84 is located within operating proximity to the top panel 12. As described, the metal detector supports 88 are adjustable in terms of height and width within the apertures 86 to facilitate the use of many commonly designed metal detectors 84 as are known in the art. Once the operator properly adjusts the metal detector supports 88, the hand held detector may be secured utilizing securing device 90 such as, for example, a plurality of rubber bands. The metal detector 84 may then be energized by any commonly known electrical means, including, for example, AC current, DC current, batteries, or the like.

In the preferred orientation shown, the bottom portions 40, 48, 60, 74 of the sidewalls 14, 16, front wall 18, and back wall 20, respectively, are designed to be placed upon any generally support surface (e.g., the floor) oriented generally parallel to the ground. In this way, the top panel 12 is supported above the sidewalls 14, front wall 18, and back wall 20 and above the compartment 24 containing the metal detector support 88 and the metal detector 84. In the embodiment shown in FIGS. 2–7, the top panel 12 may be raised approximately 8 inches above the supporting surface.

Once properly oriented and energized, an individual subjected to a screening process may approach the prescreening device 10 and place an object on, or close to, the top panel 12. In the preferred embodiment, the object may be the individual's shoe. The metal detector 84, may then detect whether the object placed in proximity to the top panel 12 contains enough material to possibly cause the primary screening device 4 to alarm. If the prescreening device 10 fails to detect the presence of enough material, the individual subjected to the screening process will preferably hear no audible alarm. If however, the prescreening device 10 detects the presence of enough material in the object placed in proximity to the top panel 12, the individual will preferably hear an audible alarm which may be the individual's indication that the object should be removed and placed on a secondary screening device, such as an x-ray machine commonly used in typical screening stations. By indicating the presence of metal in the object placed on the top panel 12, the time operators of the screening stations spend on resolving alarms caused by harmless material may be reduced, and safety personnel may spend more time focusing on legitimate threats to persons and property.

It will be appreciated by one of ordinary skill in the art that while the base 11 has been described with reference to a specific embodiment, any number of base shapes and sizes may be used without straying from the teachings of the present invention. Moreover, base 11 may be manufactured from any one or a combination of wide range materials depending on the application or desires of the user.

The prescreening device 10 described and disclosed herein is not intended to be limited by any particular materials used for constructing its various components. Although a metal detector construction has been disclosed and described herein in accordance with the teaching of the present invention, the scope of coverage of this patent is not limited thereto. On the contrary, this patent covers all embodiments of the teachings of the invention that fairly fall within the scope of permissible equivalence.

What is claimed:

1. A prescreening device for supporting a metal detector comprising:
   a top panel;
   a plurality of sidewalls extending downwardly from a perimeter of the top panel and being operatively interconnected to one another;
   an interior compartment defined by the top panel and the plurality of sidewalls; and
   a metal detector support adapted to support at least a portion of a metal detector within the interior compartment, the support adapted to permit the metal detector to be supported in an operating position sufficient to enable the metal detector to detect the presence of metal placed in proximity to the top panel,
   wherein the metal detector support is operatively connected to at least one of the plurality of sidewalls, and wherein the metal detector support is moveable between a plurality of positions within the interior compartment.

2. A prescreening device for supporting a metal detector comprising:

a top panel;

an interior compartment defined by the top panel and at least one sidewall;

a metal detector support adapted to support at least a portion of a metal detector within the interior compartment, the support adapted to permit the metal detector to be supported in an operating position sufficient to enable the metal detector to detect the presence of metal placed in proximity to the top panel;

a display unit adapted to display information; and a display stand operatively interconnected to at least one of the top panel and the sidewall, wherein the display stand is adapted to support the display unit, wherein the metal detector support is adjustably connected to the at least one sidewall, and wherein the metal detector support is adjustably moveable between a plurality of positions within the interior compartment.

3. A prescreening device for supporting a metal detector comprising:

a top panel;

an interior compartment defined by the top panel and at least one sidewall;

a metal detector; and a metal detector support adapted to support at least a portion of the metal detector within the interior compartment, the support adapted to permit the metal detector to be supported in an operating position sufficient to enable the metal detector to detect the presence of contraband placed in proximity to the top panel, wherein the metal detector support is operatively connected to the at least one sidewall and wherein the metal detector support is moveable between a plurality of positions within the interior compartment.

* * * * *